(12) United States Patent  
Shimonishi et al.

(10) Patent No.: US 8,039,744 B2
(45) Date of Patent: Oct. 18, 2011

(54) STRUCTURE FOR PROTECTIVELY SUPPORTING AN ELEMENT THAT EXTENDS BETWEEN RELATIVELY MOVABLE COMPONENTS

(75) Inventors: Yasuharu Shimonishi, Hiroshima (JP); Yuichiro Hamada, Hiroshima (JP)

(73) Assignee: Lear Corporation, Southfield, MI (US)

( * ) Notice: Subject to any disclaimer, the term of this patent is extended or adjusted under 35 U.S.C. 154(b) by 530 days.

(21) Appl. No.: 12/220,544

(22) Filed: Jul. 25, 2008

(65) Prior Publication Data

US 2010/0018766 A1 Jan. 28, 2010

(51) Int. Cl.
*H02G 3/04* (2006.01)
(52) U.S. Cl. ..................................... 174/72 C
(58) Field of Classification Search ............... 174/72 A, 174/72 C, 135, 69, 70 C, 68.3, 70 R, 72 R, 174/71 R; 439/11, 34, 502, 503
See application file for complete search history.

(56) References Cited

U.S. PATENT DOCUMENTS

| | | | |
|---|---|---|---|
| 4,746,766 A | 5/1988 | Soulard | |
| 5,877,936 A | 3/1999 | Nishitani et al. | |
| 6,036,259 A | 3/2000 | Hertel et al. | |
| 6,076,883 A | 6/2000 | Labonde et al. | |
| 6,107,570 A * | 8/2000 | Suzuki et al. | 174/72 A |
| 6,161,894 A | 12/2000 | Chapman | |
| 6,174,020 B1 | 1/2001 | Knettle et al. | |
| 6,176,715 B1 | 1/2001 | Buescher | |
| 6,340,199 B1 | 1/2002 | Fukumoto et al. | |
| 6,354,651 B1 | 3/2002 | Mori | |
| 6,494,523 B2 | 12/2002 | Kobayashi | |
| 6,515,229 B2 | 2/2003 | Aoki et al. | |
| 6,603,076 B2 | 8/2003 | Doshita et al. | |
| 6,781,058 B1 | 8/2004 | DeCicco et al. | |
| 6,796,834 B2 | 9/2004 | Suzuki et al. | |
| 6,881,902 B2 | 4/2005 | Aoki et al. | |
| 6,919,511 B2 | 7/2005 | Tsunoda et al. | |
| 6,930,244 B1 * | 8/2005 | Nebel | 174/486 |
| 6,996,967 B2 | 2/2006 | Kobayashi | |
| 7,053,306 B2 | 5/2006 | Tsubaki et al. | |
| 7,220,129 B1 | 5/2007 | Nishijima et al. | |
| 7,253,361 B2 | 8/2007 | Nishijima et al. | |
| 7,265,295 B2 | 9/2007 | Kogure et al. | |
| 7,304,239 B1 * | 12/2007 | Harris et al. | 174/72 A |
| 7,482,538 B2 | 1/2009 | Kisu et al. | |
| 7,686,380 B2 * | 3/2010 | Ochi | 174/72 A |
| 2006/0267380 A1 | 11/2006 | Gotou et al. | |
| 2007/0119610 A1 * | 5/2007 | Kisu et al. | 174/72 A |

FOREIGN PATENT DOCUMENTS

DE 102006049992 A1 5/2007

OTHER PUBLICATIONS

German Office Action to DE 10 2009 033 308.8-34 dated Oct. 28, 2010.

* cited by examiner

*Primary Examiner* — Lori Lyjak
(74) *Attorney, Agent, or Firm* — MacMillan, Sobanski & Todd, LLC

(57) ABSTRACT

A protective support structure for enclosing and protecting an element includes a hollow shield and at least one pivotable end. The hollow shield has a section adapted to support a portion of the element. The pivotable end engages the hollow shield. The pivotable end has an axis of rotation around which the end pivots. The pivotable end further includes a bore having a centerline axis. The bore centerline axis is offset from the axis of rotation of the pivotable end.

16 Claims, 4 Drawing Sheets

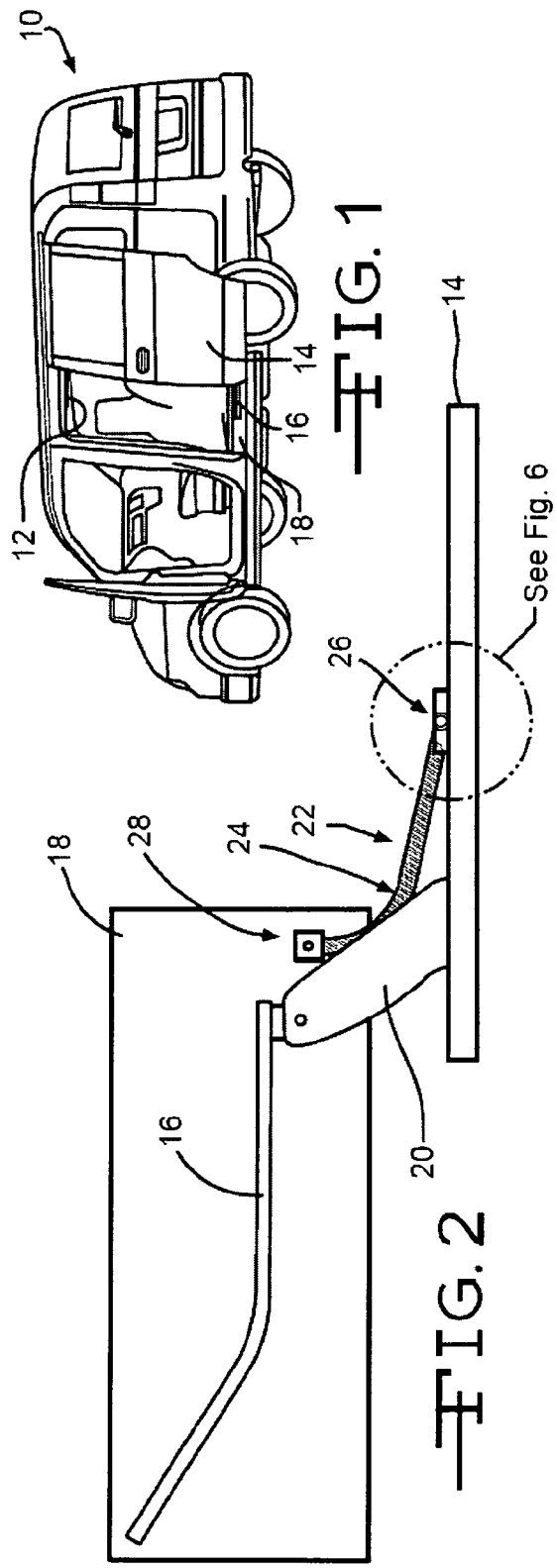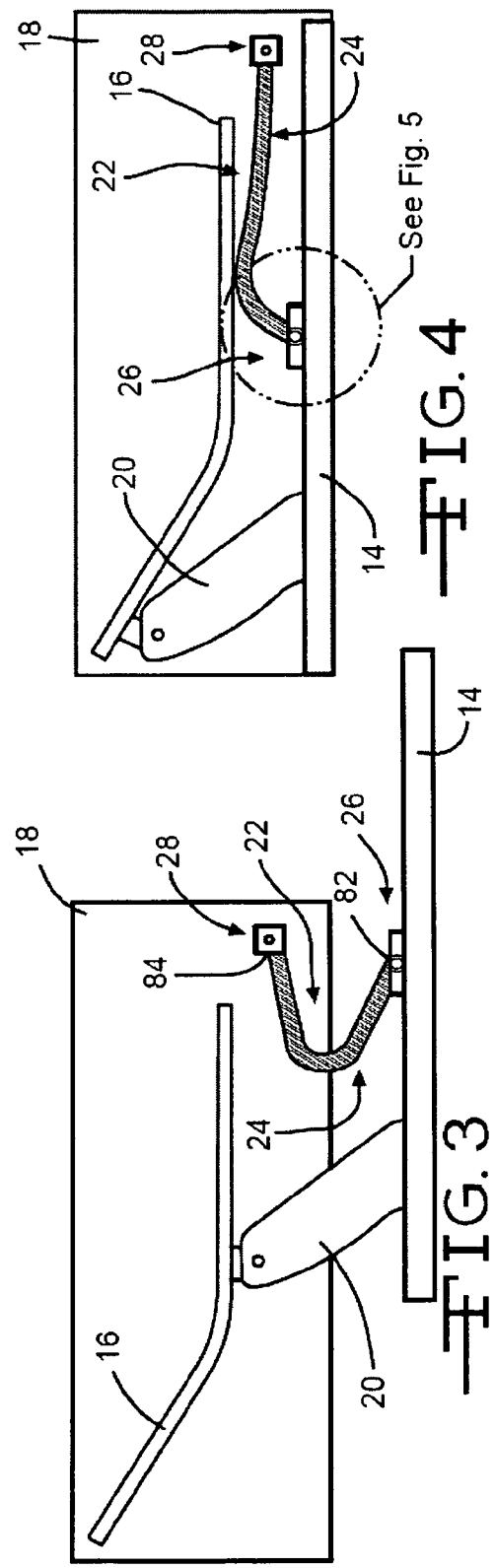

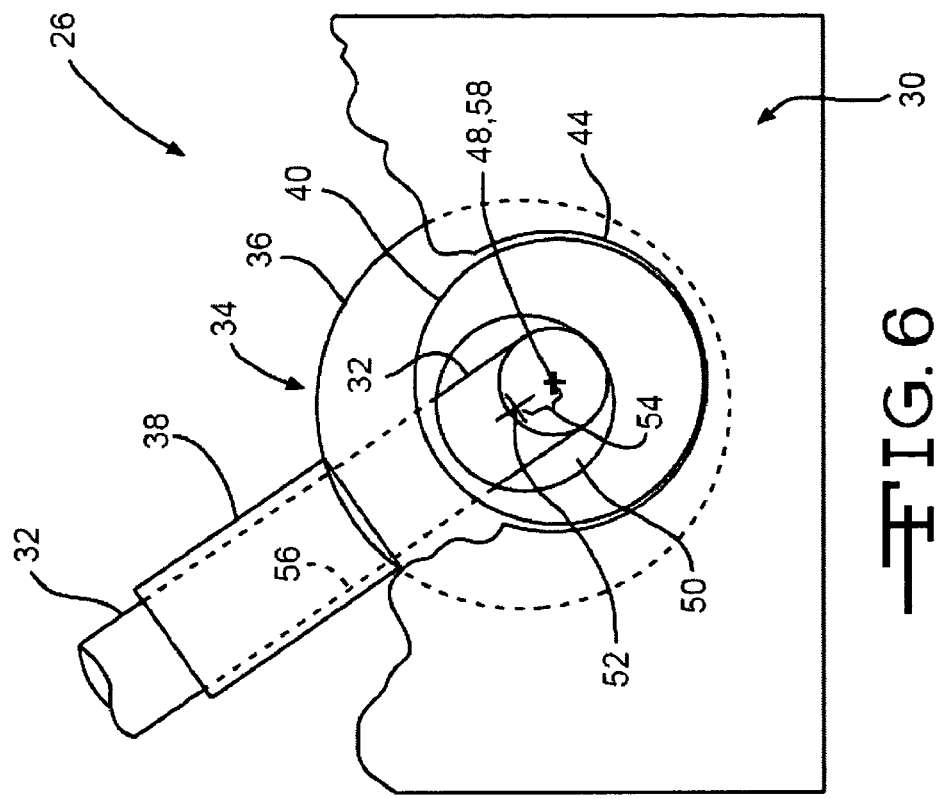
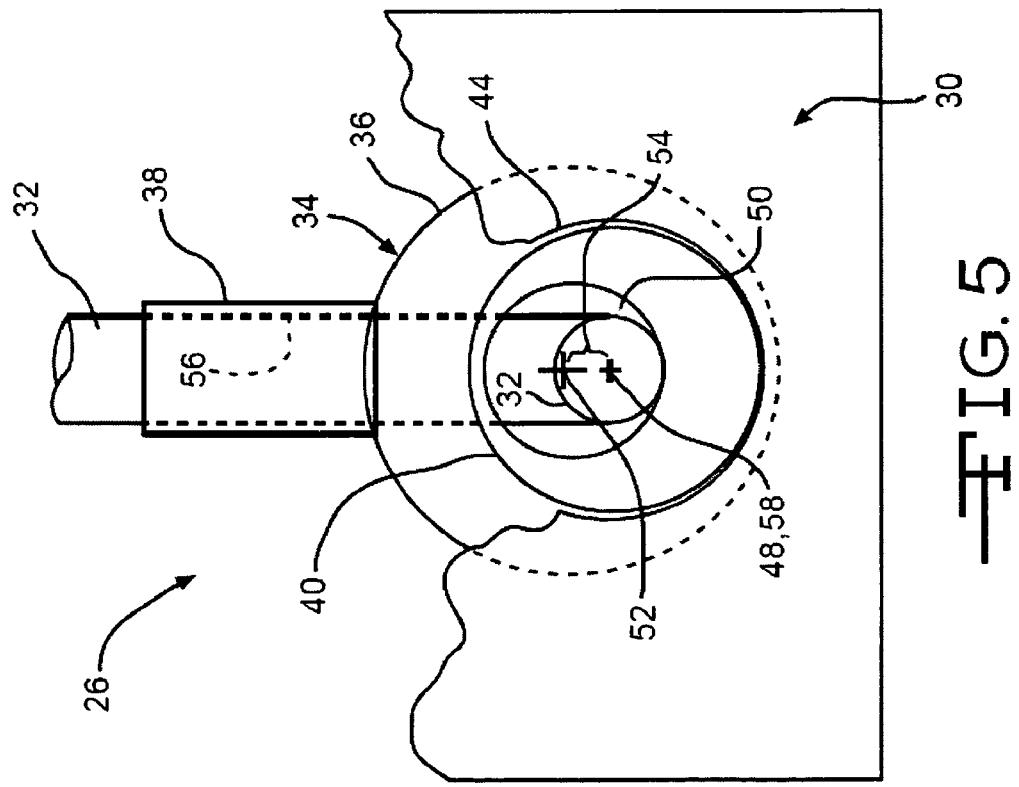

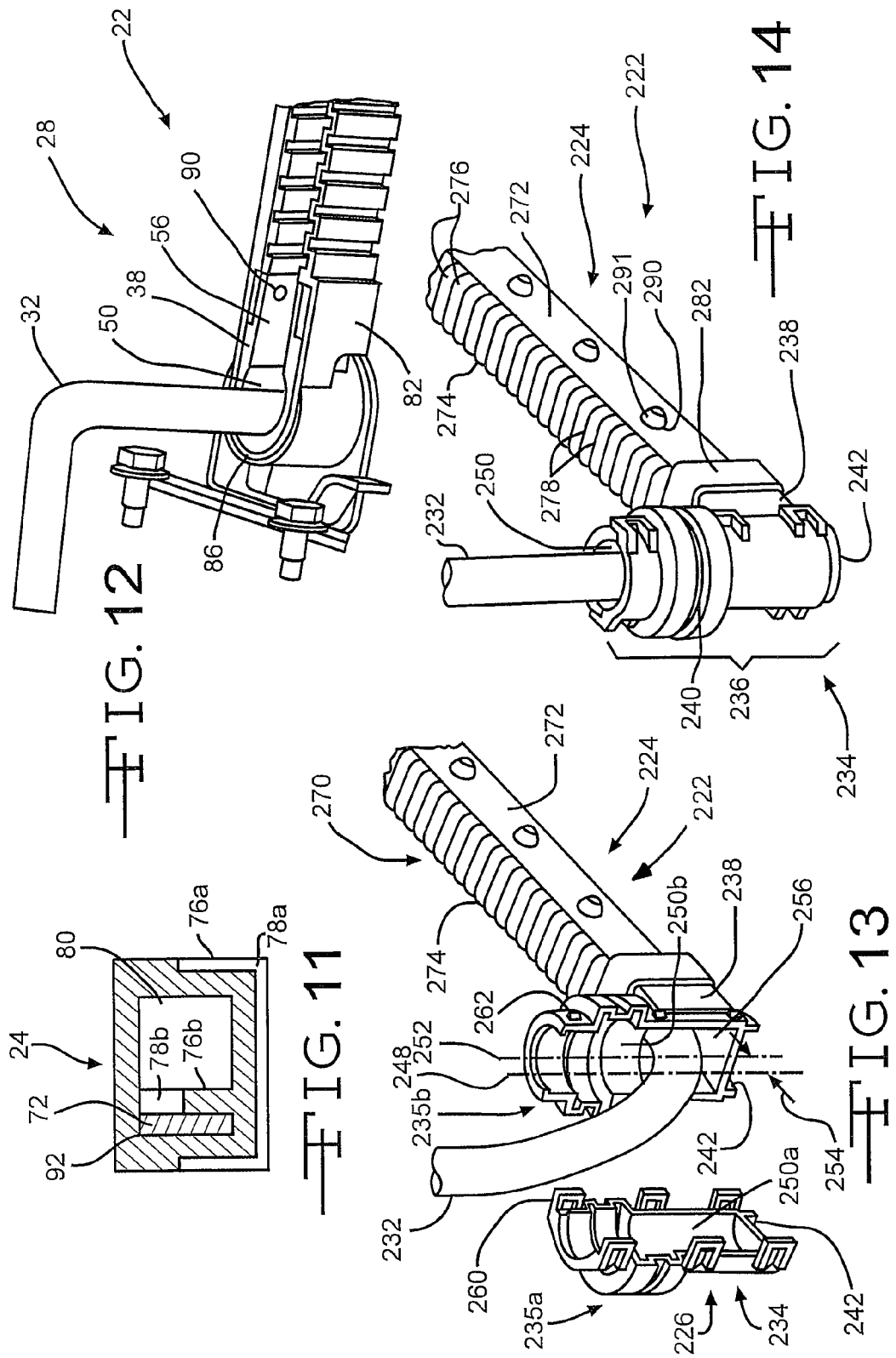

STRUCTURE FOR PROTECTIVELY SUPPORTING AN ELEMENT THAT EXTENDS BETWEEN RELATIVELY MOVABLE COMPONENTS

BACKGROUND OF THE INVENTION

This invention relates in general to a structure for protectively supporting an element that extends between first and second components that are movable relative to one another. In particular, this invention relates to an improved structure for protectively supporting an electrically conductive element that extends between a body of a vehicle and a door that is slidably mounted on the body of the vehicle.

Many structures are known in the art that include first and second components that are movable relative to one another. For example, most land vehicles include a body having one or more doors supported thereon for movement relative thereto between opened and closed positions. In particular, most vans and minivans are supported on the body for sliding movement relative thereto. Such doors and sliding doors are provided to facilitate ingress into (when the door is in the opened position) and egress out of (when the door is in the closed position) an interior of the vehicle.

Frequently, it is desirable to provide an element that extends between the relatively movable components of these vehicles and other structures. In the context of a vehicle, it is often desirable to provide an electrically conductive element that extends between the body of a vehicle and a door that is slidably mounted on the body of the vehicle. The electrically conductive element supplies electrical power from a source provided within the body of the vehicle to one or more electrical accessories (such as lights, door locks, etc.) provided within the sliding door.

To protect the electrically conductive element from damage, a protective support structure is also usually provided between the relatively movable components of these vehicles and other structures. In the context of a vehicle, a typical protective support structure includes a first end that is secured to the body of the vehicle, a second end that is secured to the sliding door, and a hollow shield that extends between the first and second ends. The electrically conductive element extends through the first end, the hollow shield, and the second end so as to be protectively covered thereby during use.

A variety of such protective support structures are known in the art and have functioned in a satisfactory manner. However, it has been found that in some instances, particularly when the amount of relative movement between the components of the structure is relatively large, the protective support structure can cause bending or twisting of the enclosed electrically conductive element. In other instances, the protective support structure can rub against the enclosed electrically conductive element. Both of these instances are undesirable because they can cause wear of the electrically conductive element. Thus, it would be desirable to provide an improved structure for protectively supporting an element that extends between relatively movable components that avoids these problems.

SUMMARY OF THE INVENTION

This invention relates to an improved structure for protectively supporting an element that extends between first and second components that are movable relative to one another and that minimizes undesirable wear during use.

Various aspects of this invention will become apparent to those skilled in the art from the following detailed description of the preferred embodiments, when read in light of the accompanying drawings.

BRIEF DESCRIPTION OF THE DRAWINGS

FIG. 1 is a perspective view of a vehicle including a body, a door that is slidably mounted on the body, and a structure for protectively supporting an element that extends between body and the sliding door in accordance with this invention.

FIG. 2 is a schematic top plan view of portions of the body, the sliding door, and the protective support structure illustrated in FIG. 1, wherein the sliding door is shown in an opened position relative to the body.

FIG. 3 is a schematic top plan view similar to FIG. 2 showing the sliding door in an intermediate position relative to the body.

FIG. 4 is a schematic top plan view similar to FIGS. 2 and 3 showing the sliding door in a closed position relative to the body.

FIG. 5 is an enlarged schematic top plan view of a portion of a first embodiment of the protective support structure illustrated in FIGS. 2, 3, and 4 when the sliding door is in the closed position relative to the body.

FIG. 6 is an enlarged schematic top plan view similar to FIG. 5 showing the portion of the first embodiment of the protective support structure when the sliding door is in the opened position relative to the body.

FIG. 11 is an enlarged sectional elevational view taken along line 11-11 of FIG. 10.

FIG. 12 is a perspective view of the first embodiment of the protective support structure of the sliding door illustrated in FIGS. 10 and 11.

FIG. 13 is an exploded perspective view of a second embodiment of the protective support structure shown in FIGS. 2, 3, and 4.

FIG. 14 is a perspective view of the second embodiment of the protective support structure illustrated in FIG. 13 shown assembled.

DETAILED DESCRIPTION OF THE PREFERRED EMBODIMENTS

Figure 7:
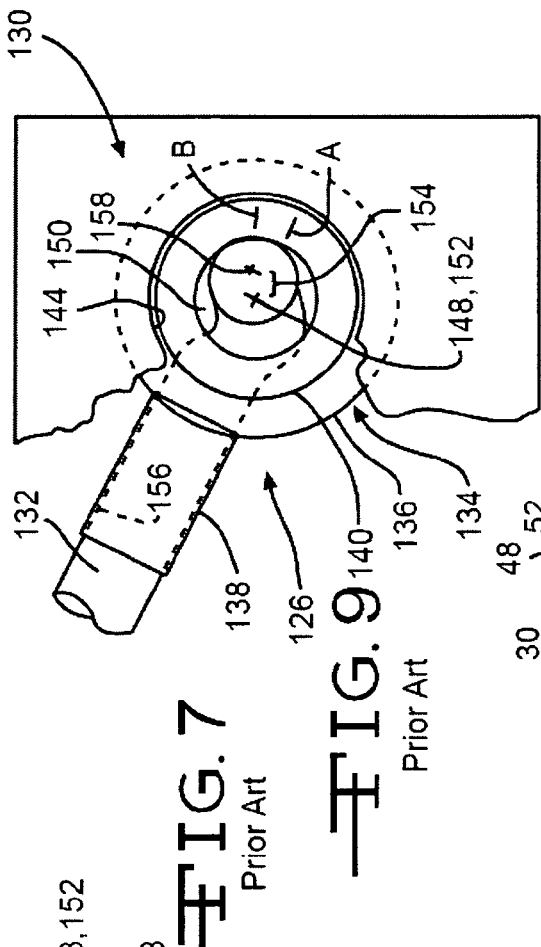
FIG. 7 is an enlarged schematic top plan view of a portion of a conventional protective support structure when the sliding door is in the closed position relative to the body.

Referring now to the drawings, there is illustrated in FIG. 1 a vehicle, indicated generally at 10, in accordance with this invention. The illustrated vehicle 10 is, in large measure, conventional in the art and is intended merely to illustrate one environment in which this invention may be used. Thus, the scope of this invention is not intended to be limited for use with the specific vehicle 10 illustrated in FIG. 1 or with vehicles in general. On the contrary, as will become apparent below, this invention may be used in any structure that includes components that are movable relative to one another.

The illustrated vehicle 10 includes a body 12 and a door 14 that is supported on the body 12 for movement from an opened position (illustrated in FIGS. 1 and 2) through an intermediate position (illustrated in FIG. 3) to a closed position (illustrated in FIG. 4), and back to the opened position. In the opened position, the door 14 does not extend over an opening defined by the body 12, thereby allowing ingress into and egress out of an interior space of the vehicle 10. In the closed position, the door 14 extends over the opening defined by the body 12, thereby preventing access to the interior of the vehicle 10. In the illustrated embodiment, the door 14 is supported on the body 12 of the vehicle 10 for conventional sliding movement between the opened, intermediate, and closed positions. However, the door 14 may be supported for any type of movement relative to the body 12 of the vehicle 10, including pivoting movement and the like.

To facilitate the sliding movement of the door 14 relative to the body 12 of the vehicle 10, a conventional track mechanism 16 may be provided on a lower support structure 18 (such as a floor pan) of the body 12 of the vehicle 10. The track mechanism 16 is adapted to engage and guide a conventional lower door mounting support 20 that is provided on the sliding door 14. As is known in the art, the vehicle 10 may additionally include an upper track mechanism (not shown) that cooperates in a similar manner with an upper door mounting support (not shown) to facilitate the sliding movement of the door 14 relative to the body 12 of the vehicle 10.

A protective support structure, indicated generally at 22, extends between the body 12 of the vehicle 10 and the door 14. The protective support structure 22 is provided to enclose and support an element (not shown) that extends between the body 12 of the vehicle 10 and the sliding door 14. In the illustrated embodiment, the element that is enclosed and supported by the protective support structure 22 is an electrically conductive element (such as a conventional wiring harness) that can supply electrical power from a source (not shown) disposed within the body 12 of the vehicle 10 to one or more electrical accessories (such as lights, door locks, etc.) disposed within the sliding door 14. However, the element that is enclosed and supported by the protective support structure 22 can be any desired component that extends between any two relatively movable components.

The illustrated protective support structure 22 includes a hollow shield 24 that extends between a first end 26 that is secured to the sliding door 14 and a second end 28 that is secured to the body 12 of the vehicle 10. As shown in FIGS. 2, 3, and 4, the hollow shield 24 of the protective support structure 22 articulates and the first and second ends 26 and 28 of the protective support structure 22 pivot as the sliding door 14 is moved relative to the body 12 of the vehicle 10. The structures of the hollow shield 24 and the first and second ends 26 and 28 of the protective support structure 22 will be described in detail below.

FIGS. 5 and 6 illustrate the structure of the first end 26 of the protective support structure 22 illustrated in FIGS. 2, 3, and 4. As shown therein, the first end 26 of the protective support structure 22 includes a mounting bracket assembly portion 30 and a pivotable end portion 34 that cooperate to provide relative rotational movement therebetween. An element 32 such as, for example, a wiring harness is illustrated in a supported condition within the first end 26 of the protective support structure 22. Though described in the context of electrical wires or a wiring harness, the element 32 may represent any power or information transmission medium, such as wires, fiber optics, pneumatic or hydraulic tubes, cables, and the like.

The pivotable end portion 34 of the first end 26 of the protective support structure 22 includes a central body portion 36, a sleeve portion 38, and an upper pivot point 40. The upper pivot point 40 of the pivotable end portion 34 is illustrated as a cylindrical portion protruding from the central body portion 36, though such is not required. The pivotable end portion 34 further includes a lower pivot point 42, shown in FIG. 10. The mounting bracket assembly portion 30 of the first end 26 of the protective support structure 22 includes an upper mount 44, as shown in FIGS. 5 and 6, and a lower mount 46, shown in FIG. 10. The upper and lower pivot points 40 and 42, respectively, of the pivotable end portion 34 engage and cooperate with the corresponding upper mount 44 and lower mount 46 of the mounting bracket assembly 30 to define a rotational axis 48. The upper and lower mounts 44 and 46, respectively, may be any structure or geometry adapted to cooperate with the pivotable end portion 34 to define the rotational axis 48 thereof and allow relative rotational movement therewith.

The pivotable end portion 34 also includes a first bore 50 having a first bore centerline 52. The first bore centerline 52 is oriented in a spaced apart relationship to the rotational axis 48 by an offset 54. The bore centerline 52 may be spaced apart in a parallel relationship to the rotational axis 48, where the offset 54 is a lateral offset. Alternatively, the bore centerline 52 may be oriented at an acute angle to the rotational centerline axis 48, where the offset 54 is an acute angular offset, if so desired.

Figure 10:
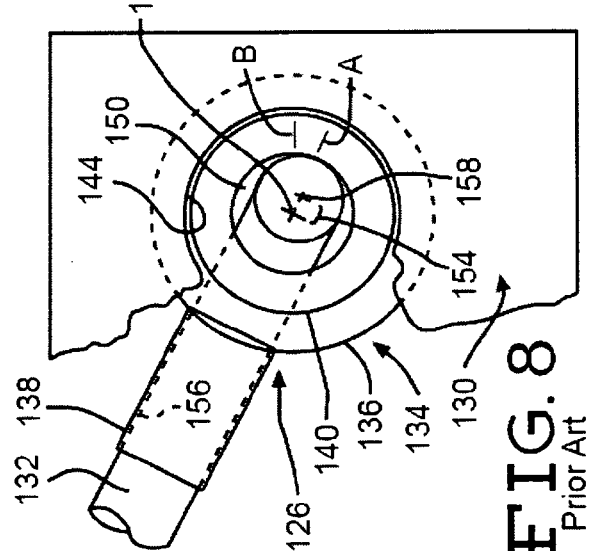
FIG. 10 is a side elevational view of the first embodiment of the protective support structure of the sliding door illustrated in FIGS. 2, 3, and 4.

The sleeve portion 38 extends from the central body portion 36 and includes a second bore 56 formed therethrough. As shown in FIG. 10, the sleeve portion 38 extends in a generally perpendicular orientation to the central body portion 36, though other relative orientations may be used if so desired. The second bore 56 intersects the first bore 50 at an angle such as, for example, a right angle, for communication therewith. The element 32 may be passed through the first and second bores 50 and 56, respectively, as shown in FIGS. 5 and 6. The element 32 has a center 58 that lies in a generally and substantially coincident orientation with the rotational axis 48 when assembled into the pivotable end 34. The generally and substantially coincident orientation is defined as a relative orientation of the element center 58 to the rotational axis 48 that is within generally accepted manufacturing and assembly tolerances for the routing of wiring or tubing within a vehicle.

Referring now to FIG. 6, the pivotable end 34 is illustrated in an articulated position relative to the mounting bracket assembly 30. The upper pivot point 40 rotates relative to the upper mount 44 about the rotational axis 48. The first bore centerline 52 rotates about the rotational axis 48. The element center 58 generally follows the movement of the rotational axis 48. As a result of the generally and substantially coincident nature of the rotational axis 48 to the element center 58, the element 32 is free to twist or move with the pivotable end 34 during articulation. This orientation prevents or minimizes abrasion of the element 32 against portions of the first bore 50.

With the sliding door 14 in the closed position shown in FIG. 4, the first support end 26 is illustrated with the sleeve portion 38 in a first position, shown in FIG. 5. As the sliding door is moved from the closed position of FIG. 4 to the open position of FIG. 2, the pivotable end 34 articulates, relative to the mounting bracket assembly 30, from the first position of FIG. 5 to an angularly displaced, second position, shown in FIG. 6. The element center 58 substantially maintains the relative orientation with the perimeter wall of the bore 50.

The element 32 may be fixed at a free end (not shown) and constrained from movement by a connector (not shown) or a wire mount (not shown) that is positioned away from the first end 26. The element 32 may also be relatively stiff, as is the case where a plurality of wires (not shown) are gathered together in a bundle. In this configuration, the element 32 is able to substantially twist during the rotational movement of the pivotable end 34 rather than slide or bend within the bore 50. The substantial twisting motion is accomplished by the element 32 being positioned against the perimeter wall of the bore 50 such that the centerline 58 is generally and substantially coincident with the rotational axis 48.

Some installations may have a relatively flexible element 32 such as, for example, where there is only one wire, or a plurality of thin gauge wires. Additionally, the free end of the element 32 may be constrained in closer proximity to the first end 26. With the element center 58 oriented generally and substantially coincident with the rotational axis 48, the resultant movement of the assembly is generally unitary, i.e. the harness 32 moves with the pivotable end 34. This reduces or eliminates rotationally induced bending loads on the element 32.

Figure 9:
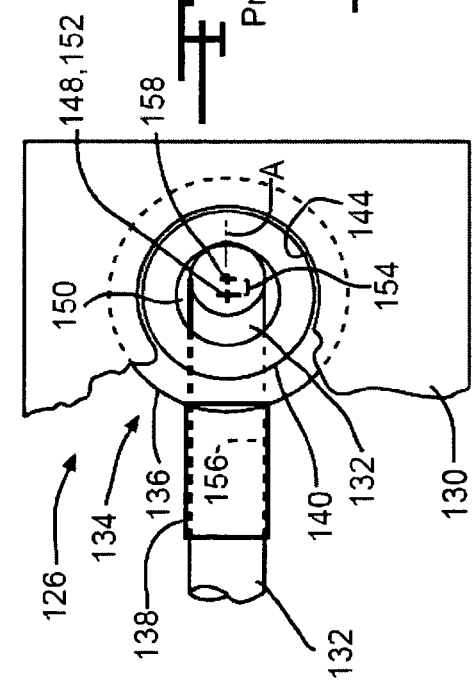
FIG. 9 is an enlarged schematic top plan view similar to FIG. 7 showing the conventional protective support structure when the sliding door is in the opened position relative to the body, showing undesirable bending movement of the enclosed element.
Figure 8:
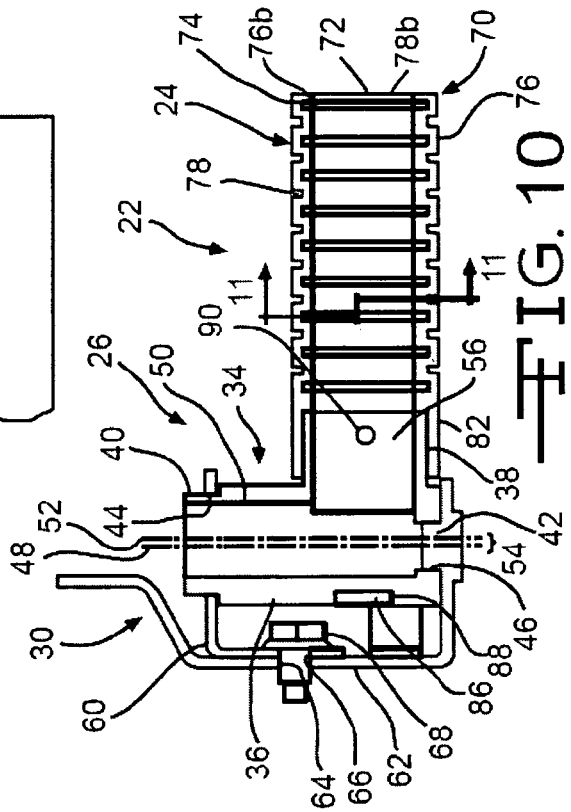
FIG. 8 is an enlarged schematic top plan view similar to FIG. 7 showing the conventional protective support structure when the sliding door is in the opened position relative to the body, showing undesirable sliding movement of an enclosed element.

FIGS. 7-9 illustrate a prior art end assembly 126 that forms part of a prior art hollow shield (not shown). Similar reference numbers are used to represent similar structures of the prior art device to those described in the various embodiments of the invention herein. The prior art end assembly 126 includes a mounting bracket assembly 130, a wiring harness 132, and a pivotable end 134. FIG. 7 illustrates the prior art pivotable end 134 in a first position relative to the mounting bracket assembly 130, that is similar to the position of the pivotable end 34 shown in FIG. 5.

The prior art pivotable end 134 includes a central body portion 136, a sleeve portion 138, and an upper pivot point 140. The pivotable end 134 may also include a lower pivot point (not shown). The central body portion 136 includes a first bore 150 having a bore centerline 152. The bore centerline 152 is oriented in a substantially coincident relationship to the rotational axis 148. The sleeve portion 138 includes a second bore 156 that intersects the first bore 150 for communication therewith. The wiring harness 132 includes a center line 158 that is spaced apart from the rotational axis 148 by an offset 154.

Many prior art depictions of pivotable ends show the centerline 158 of the wiring harness 132 positioned in a coincident relationship with the bore centerline 152 but not contacting the inner surface of the first bore 150. This orientation, however, in an actual installation, normally does not exist. The wiring harness 132, by virtue of the stiffness of the wire or plurality of wires (not shown) contained therein, typically rests against a portion of the perimeter wall of the first bore 150. As such, the stiffer the wiring harness 132 the more force is applied against the perimeter wall of the bore 150. The pivotable end 134 articulates by the upper pivot point 140 rotating within the upper mounting point 144. As the pivotable end 134 is articulated from the first position of FIG. 7 to a second position, shown in FIGS. 8 and 9, the wiring harness 132 moves relative to the perimeter wall of the bore 150 from a first position "A" to a second position "B".

FIG. 8 further depicts the movement of the wiring harness 132 to be back and forth the between positions "A" and "B". This movement may occur, for example, where the free end of the wiring harness 132 is constrained from movement by a connector (not shown) or a wire mount (not shown) that is positioned away from the end assembly 126 and the wiring harness 132 is relatively stiff. Such a configuration may result in the wiring harness 132 traveling with the bore 150 for a distance by virtue of the friction between the mating surfaces. As the deflection continues, the stiffness of the wiring harness 132 may overcome the frictional force and cause the wire to slide against the bore 150. This sliding motion causes incremental wear on the junction of the wiring harness 132 and the bore 150.

FIG. 9 depicts an alternative movement scenario where the wiring harness 132 may be, for example, relatively flexible and constrained closer to the pivotable end 134. As the bore 150 moves about the rotational axis 148, the offset position 154 of the wiring harness centerline 158 may cause the wiring harness 132 to deflect. This deflection subjects the wiring harness 132 to additional bending loads moving between points "A" and "B". These bending loads may fatigue the metal wires or tubes contained within the support, causing an undesirable connection disruption.

Referring to FIG. 10, the protective support structure 22 may have the mounting bracket assembly 30 configured to support the pivotable end 34 with an upper bracket 60 and a lower bracket 62. The upper bracket 60 may include the upper pivot point 40 and at least one attachment point 64 to secure the upper bracket 60 to either the sliding door 14 or a portion of the vehicle 10. The lower bracket 62 may include the lower pivot point 42 and at least one attachment point 66 to secure the lower bracket 62 to the sliding door 14 or a portion of the vehicle 10. The upper and lower attachment points 64 and 66, respectively, may be aligned apertures that allow a fastener 68 such as, for example, a bolt, screw, rivet, pin, and the like to pass therethrough.

During assembly and installation of the protective support structure 22 to the vehicle 10, the lower pivot point 42 may be engaged with the lower mount 46 of the lower bracket 62. The upper mount 44 of the upper bracket 60 engages the upper pivot point 40 of the pivotable end 34 such that the upper and lower mounts 44 and 46, respectively, are substantially coaxially aligned. This alignment allows rotation of the pivotable end 34 relative to the mounting bracket assembly 30. The fastener 68 maintains the orientation of the upper and lower mounting brackets 60 and 62, respectively, relative to the pivotable end 34, in addition to securing the mounting bracket assembly 30 and pivotable end 34 to the sliding door 14 or the vehicle 10.

The hollow shield 24 of the protective support structure 22 includes a bellows portion 70 and a resilient stiffening leaf 72. The bellows portion 70 includes a plurality of convolutions 74 along the lengthwise portion between the first and second ends 26 and 28, respectively. The convolutions 74 may be arranged as a contoured surface having alternating projections 76 and recesses 78 or as an undulating surface having, for example, a sinusoidal cross section. The contoured surface is such that the adjacent peaks of the convolutions 74 are permitted to move relatively together or apart to facilitate deflection of the hollow shield 24. The projections 76 and recesses 78 are arranged as outer projections 76a, outer recesses 78a, inner projections 76b, and inner recesses 78b.

The bellows portion 70 further defines an interior cavity or passage 80 that communicates with the first and second bores 50 and 56, respectively, of each pivotable end 34. The first and second communicating bores 50 and 56, respectively, and passage 80 allow the element 32 to pass from one structure such as, for example, the vehicle floor pan 18, to another relatively moveable structure such as, for example, the sliding door 14. The bellows portion 70 includes a first mounting end 82 and a second mounting end 84, that may be similarly constructed if so desired. The mounting ends will be described with respect to the first mounting end 82. Alternatively, one of the first and second mounting ends 82 and 84, respectively, may be a fixed, non-rotating end, if so desired. The first mounting end 82 engages the sleeve portion 38.

In the embodiment shown in FIGS. 10 and 12, the first mounting end 82 includes an attachment band 86 that wraps around part of the central body portion 36. The band 86 may be disposed within a groove 88 or positioned on the outer surface of the central body portion 36. Alternatively, the band 86 may be molded or otherwise disposed within the central body portion 36. The connection between the sleeve portion 38 and the first mounting end 82 of the hollow shield 24 may be a removable connection such as, for example, a snap fit or a frictionally engaged connection. Alternatively, the first mounting end 82 may be permanently attached with a fastener 90 such as, for example, a rivet, screw, compression fitting, adhesive, and the like, or may be integrally molded to the pivotable end 34. FIGS. 10 and 12 illustrate the fastener 90 engaging the first mounting end 82, the leaf 72, and the sleeve portion 38.

The bellows portion 70 may be made from any suitable elastomeric material that allows the structure to flex and prevents intrusion of environmental contaminants, such as water, brine, or other elements corrosive to the contents therein. Elastomers such as rubber, nitrile or buna-n nitrile rubber, fluoroelastomers (such as, for example, Viton®), thermoplastic polyester elastomers (such as, for example, Hytrel® or Santoprene®), and the like provide illustrative examples of suitable materials, not an exhaustive listing.

In the embodiment shown in FIGS. 10 and 11, the resilient stiffening leaf 72 is disposed within the bellows portion 70. The leaf 72 may be integrally molded with the bellows portion 70. Alternatively, the bellows portion 70 may include a slot 92 that receives the leaf 72. The slot 92 may be formed between an outer wall of the bellows portion 70 and the alternating inner projections 76b and inner recesses 78b. The stiffening leaf 72 is a resilient structure having a thickness dimension that is relatively thin compared to the length or width dimensions thereof. The flexible characteristic of the leaf 72 bears a similarity to the flexibility of the ruled portion of a retractable or coil tape measure. The leaf 72 may be made from a metal, such as for example spring steel, steel, aluminum, and the like. Alternatively, the leaf 72 may be made of a resin, fiber reinforced resin, or other composite structure.

The leaf 72 is flexible when deflected or bent about the length dimension and across or transverse to the thickness dimension, such as a "U" shaped deflection. The leaf 72 is comparably stiffer when loaded along the length dimension and across or transverse to the width dimension. The leaf 72 supports the bellows portion 70 from drooping or otherwise substantially articulating out of a plane defined between the flexible harness support ends 26 and 28 and substantially perpendicular to the width dimension of the leaf 72. As the bellows portion 70 and the leaf 72 are deflected during articulation of the sliding door 14, the inner recesses 78b provide sufficient room for adjacent inner projections 76b to deflect together. The inner recesses 78b are illustrated in FIGS. 10-12 as exposing the leaf 72 to the interior cavity 80, though such is not required.

FIGS. 13 and 14 illustrate an embodiment of a first end 226 having a two-piece pivotable end, shown generally at 234, and a hollow shield 224 of a protective support structure 222. A mounting bracket assembly (not shown) may be provided similar to the bracket 26 described above, though such a bracket configuration is not required.

The two-piece pivotable end 234 includes a first housing portion 235a having a first central bore section 250a and a second housing portion 235b having a second central bore section 250b. The first housing portion 235a and the second housing portion 235b cooperate to form a central body portion 236, that defines an upper pivot point 240 and a lower pivot point 242. The upper and lower pivot points 240 and 242, respectively, cooperate to define a rotational axis 248. The first and second central bore sections 250a and 250b, respectively, cooperate to define a first bore 250, shown in FIG. 14. A sleeve portion 238 extends from the second housing portion 235b. The sleeve portion 238 includes a second bore 256 that intersects the second central bore section 250b. The second bore 256 communicates with the assembled first bore 250 to facilitate passage of an element 232 therethrough.

The first and second housing portions 235a and 235b, respectively, may include a plurality of locking tabs 260 and protrusions 262 that cooperate to secure the two housing portions together. The cooperating locking tabs 260 and protrusions 262, in the illustrated embodiment, form a releasable connection between the first and second housing portions 235a and 235b, respectively. Alternatively, the first and second housing portions 235a and 235b, respectively, may be secured together permanently. The locking tabs 260 and protrusions 262 may be any structure adapted to secure the two housing portions together such as, for example, bands, clamps, tongue-and-groove, adhesives, and the like. Alternatively, the tabs 260 and the protrusions 262 may be omitted.

The cooperating first and second housing portions 235a and 235b, respectively, form the first bore 250 that defines a bore centerline 252. The bore centerline 252 is spaced apart from the rotational axis 248 by an offset 254. The offset 254 provides the same or similar functions and benefits described above in conjunction with the offset 54 of the one piece pivotable end 34. The separable nature of the two-piece pivotable end 234 facilitates the installation of element 232 through a bellows portion 270 of the protective support structure 222, especially stiff elements. Routing of element 232 while the first housing portion 235a is removed prevents the entire element length from bending through the angle of the intersecting first and second bores 250 and 256, respectively.

The hollow shield 224 includes a bellows portion 270, illustrated as a hollow, flexible support, having a first mounting end 282 that engages the sleeve portion 238 of the two-piece pivotable end 234. The bellows portion 270 includes a second end (not shown) that may be similar to the first mounting end 282.

The bellows portion 270 of the hollow shield 224 may have a plurality of convolutions 274 disposed along the length. The convolutions 274 facilitate flexure of the hollow shield 224 during articulation of the sliding door 14. The convolutions 274 may be of any desired cross sectional shape, such as arcuate, circular, elliptical, triangular, rectangular, rhomboidal, and the like. The convolutions 274 may be arranged as a contoured surface having alternating peaks 276 and recesses 278 that may be a generally undulating surface having a cross section such as, for example, a sinusoidal cross section. The contoured surface is such that adjacent peaks of the convolutions 274 are permitted to move relatively together or apart to facilitate deflection of the hollow shield 224. The cross section of the alternating peaks 276 and recesses 278 may have a substantially uniform wall thickness. Alternatively, the end 282 of the hollow shield 224 may have a non-uniform wall thickness, if so desired.

The hollow shield 224 may further include a resilient stiffening leaf 272 and at least one leaf retainer 290. The leaf 272 is configured similarly to leaf 72, as described above, in geometry, flexibility, and material composition. The leaf 272 further includes at least one retaining aperture 291, formed therethrough, that engages the corresponding leaf retainer 290. The engaged retainer 290 and retaining aperture 291 secure the leaf 272 to the bellows portion 270 to provide support of the protective support structure 222, as described above in conjunction with the first embodiment. The first mounting end 282 may also include a slot (not shown) to receive the end of the leaf 272, if so desired.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A protective support structure for enclosing and protecting an element comprising:
    a hollow shield having a section adapted to support a portion of the element; and
    at least one pivotable end engaging the hollow shield, the pivotable end having an axis of rotation around which the end pivots and further including a bore having a centerline axis, the pivotable end characterized in that the bore centerline axis is offset from the axis of rotation of the pivotable end.

2. The protective support structure of claim 1 wherein the offset is a lateral offset.

3. The protective support structure of claim 1 wherein the offset is an angular offset.

4. The protective support structure of claim 1 wherein the at least one pivotable end includes a first portion and a second portion, characterized in that the first portion is separable from the second portion.

5. The protective support structure of claim 1 wherein the hollow shield is a flexible structure having a linear portion, the linear portion defining a passage.

6. The protective support structure of claim 5 wherein the linear portion engages a resilient stiffening leaf in an orientation capable of supporting the element such that the protective support structure exhibits a bending stiffness in a first orientation that is stiffer than a bending stiffness in a second orientation.

7. The protective support structure of claim 6 wherein the linear portion includes a leaf retainer that engages the resilient stiffening leaf.

8. The protective support structure of claim 5 wherein the linear portion includes a plurality of convolutions.

9. The protective support structure of claim 1 wherein the pivotable end engages a mounting bracket for relative rotation about the pivotable end axis of rotation.

10. A protective support structure extending between a moveable structure and a stationary structure relative thereto, the protective support structure comprising:
    a first end secured to the relatively stationary structure and having a mounting bracket assembly and a pivotable end portion;
    a second end secured to the relatively moveable structure;
    a hollow shield extending between the first and second ends and engaging a resilient leaf member, the resilient leaf member having a thickness dimension that is relatively thin compared to a resilient leaf member length dimension or a resilient leaf member width dimension.

11. The protective support structure of claim 10 wherein the pivotable end portion of the first end and the mounting bracket assembly cooperate to define an axis of rotation, the pivotable end of the first portion further having a bore that defines a bore centerline, the bore centerline being offset from the axis of rotation.

12. The protective support structure of claim 10 wherein the second end includes a pivotable end portion.

13. The protective support structure of claim 12 wherein the pivotable end portion of the second end engages a mounting bracket assembly that defines an axis of rotation, the pivotable end of the second portion further having a bore that defines a bore centerline, the bore centerline being offset from the axis of rotation.

14. The protective support structure of claim 10 wherein the resilient leaf member is integrally molded within a portion of the hollow shield.

15. The protective support structure of claim 10 wherein the resilient leaf member engages a bellows portion of the hollow shield.

16. The protective support structure of claim 10 wherein the relatively moveable structure is a vehicle sliding door and the relatively stationary structure is a vehicle body.

\* \* \* \* \*